United States Patent
Schlemmer et al.

(10) Patent No.: US 11,002,140 B2
(45) Date of Patent: May 11, 2021

(54) GUIDE VANE SEGMENT

(71) Applicant: MTU Aero Engines AG, Munich (DE)

(72) Inventors: Markus Schlemmer, Mainburg/Sandelzhausen (DE); Andreas Hartung, Munich (DE); Karl-Hermann Richter, Markt Indersdorf (DE); Herbert Hanrieder, Hohenkammer (DE)

(73) Assignee: MTU Aero Engines AG, Munich (DE)

( * ) Notice: Subject to any disclaimer, the term of this patent is extended or adjusted under 35 U.S.C. 154(b) by 298 days.

(21) Appl. No.: 15/483,478

(22) Filed: Apr. 10, 2017

(65) Prior Publication Data

US 2017/0292387 A1    Oct. 12, 2017

(30) Foreign Application Priority Data

Apr. 11, 2016  (DE) .......................... 102016205995.5

(51) Int. Cl.
| | |
|---|---|
| *F01D 5/26* | (2006.01) |
| *F01D 5/16* | (2006.01) |
| *F01D 25/06* | (2006.01) |
| *F01D 5/14* | (2006.01) |

(52) U.S. Cl.
CPC ............... *F01D 5/26* (2013.01); *F01D 5/16* (2013.01); *F01D 25/06* (2013.01); *F01D 5/14* (2013.01); *F05D 2250/241* (2013.01); *F05D 2260/96* (2013.01)

(58) Field of Classification Search
CPC ... F01D 5/26; F01D 5/16; F01D 25/06; F01D 5/14; F01D 25/04; F05D 2250/241; F05D 2260/96; F05D 2260/961; F05D 2260/962

USPC .......................................................... 415/119
See application file for complete search history.

(56) References Cited

U.S. PATENT DOCUMENTS

| | | | |
|---|---|---|---|
| 9,228,449 B2* | 1/2016 | Cloarec | F01D 5/26 |
| 9,371,733 B2 | 6/2016 | Hartung | |
| 9,765,625 B2* | 9/2017 | Stiehler | F01D 5/10 |
| 10,001,016 B2* | 6/2018 | Stiehler | B23P 15/04 |

(Continued)

FOREIGN PATENT DOCUMENTS

| | | |
|---|---|---|
| DE | 102009010185 A1 | 8/2010 |
| EP | 2484870 | 8/2012 |

(Continued)

*Primary Examiner* — Courtney D Heinle
*Assistant Examiner* — John S Hunter, Jr.
(74) *Attorney, Agent, or Firm* — Davidson, Davidson & Kappel, LLC

(57) ABSTRACT

A guide vane segment for a turbomachine stage that has an inner ring segment (10) and a plurality of guide vanes (20) that are configured on the inner ring segment; a detuning region (V) of the inner ring segment extending in each case from a trailing edge (21) of at least one guide vane (20), in particular of at least 50% of the guide vanes (50), axially toward a leading edge (22) of the guide vane (20) over at most 50% of a width (B) of the inner ring segment (10) and/or at most 5 mm and/or circumferentially on both sides, in each case over at most 25% of a spacing (A) between adjacent guide vanes (20), at and/or in which at least one cavity (112) is configured which contains at least one impulse element (100) with clearance of motion for providing impact contacts.

18 Claims, 2 Drawing Sheets

(56) References Cited

U.S. PATENT DOCUMENTS

| | | | |
|---|---|---|---|
| 2013/0223990 A1* | 8/2013 | Cloarec | F01D 5/26 |
| | | | 415/119 |
| 2013/0280083 A1* | 10/2013 | Hartung | F01D 5/16 |
| | | | 416/223 R |
| 2014/0348639 A1 | 11/2014 | Stiehler et al. | |
| 2014/0348657 A1 | 11/2014 | Stiehler et al. | |
| 2015/0167478 A1 | 6/2015 | Hartung | |
| 2015/0167479 A1 | 6/2015 | Hartung et al. | |
| 2016/0010462 A1 | 1/2016 | Stiehler et al. | |
| 2016/0146041 A1 | 5/2016 | Hartung | |

FOREIGN PATENT DOCUMENTS

| | | |
|---|---|---|
| EP | 2806105 | 11/2014 |
| EP | 2806106 | 11/2014 |
| EP | 2966262 | 1/2016 |
| EP | 3023584 | 5/2016 |
| EP | 2884050 | 3/2017 |
| WO | WO 2012/095067 A1 | 7/2012 |

\* cited by examiner

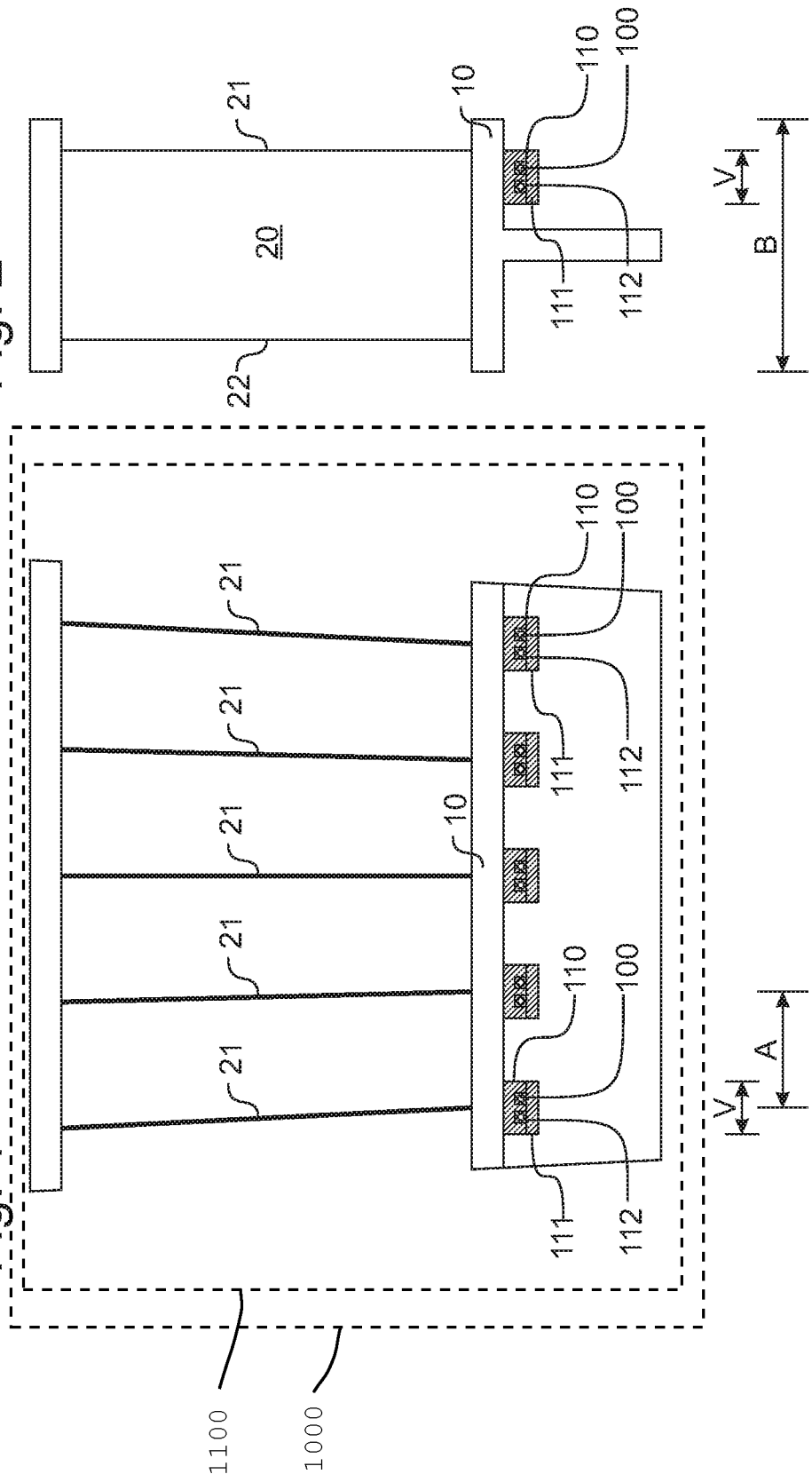

GUIDE VANE SEGMENT

This claims the benefit of German Patent Application DE 10 2016 205 995.5, filed Apr. 11, 2016 and hereby incorporated by reference herein.

The work leading to this invention was funded in accordance with Grant Agreement no. CSJU-GAM-SAGE-2008-001 in the course of The European Union's Seventh Framework Program (FP7/2007-2013) for The Clean Sky Joint Technology Initiative.

The present invention relates to a guide vane segment for a turbomachine stage, a turbomachine stage, in particular a compressor or turbine stage, having the guide vane segment, as well as to a turbomachine, in particular a gas turbine, having the turbomachine stage.

BACKGROUND

From the Applicant's own WO 2012/095067 A1, it is known to configure impulse elements on guide vanes of a gas turbine that are provided for contacting the vanes by imparting impacts thereto.

It is hereby possible to realize the Applicant's novel concept for reducing unwanted vibrations that essentially is not based on dissipating friction, but on detuning natural modes and frequencies in response to impacts imparted by the impulse elements. For further details on this detuning concept, the present disclosure also expressly makes reference to the WO 2012/095067 A1 and to the contents thereof.

SUMMARY OF THE INVENTION

It is an object of an embodiment of the present invention to improve the performance characteristics, in particular the vibration characteristics of a turbomachine, in particular of a gas turbine.

The present invention provides a turbomachine stage, in particular a compressor stage or a turbine stage, having one or a plurality of guide vane segment(s) described here, respectively a turbomachine, in particular a gas turbine, in particular an aircraft engine gas turbine, having one or more such turbomachine stages.

An embodiment of the present invention provides that a guide vane segment or guide vane assembly, in particular guide vane cluster, for a turbomachine stage, in particular a compressor stage or turbine stage of a turbomachine, in particular of a gas turbine, in particular of an aircraft engine gas turbine, in particular at least one guide vane segment of at least one turbomachine stage, in particular compressor stages or turbine stages, for a or of a turbomachine, in particular gas turbine, in particular aircraft engine gas turbine, have an inner ring segment and a plurality of guide vanes, in particular guide vane airfoils and/or for deflecting flow and/or for converting kinetic energy to pressure energy, that are configured on this inner ring segment.

In an embodiment, the inner ring segment is configured radially inwardly from the guide vanes of the guide vane segment and/or integrally formed therewith or non-destructively or destructively detachably joined thereto.

In an embodiment, one or a plurality of guide vane segment(s) described here and/or one or a plurality of further guide vane segment(s) are circumferentially, mutually adjacently disposed and form a guide vane cascade, in particular an inlet and/or outlet guide vane cascade of the turbomachine stage or are provided or adapted for this purpose.

In an embodiment, the inner ring segments of the circumferentially, mutually adjacent guide vane segments are sealed from each other, in particular by non-destructively or destructively detachably attached sealing plates, and/or radially (inwardly) bound a flow channel of the turbomachine (stage) or are adapted for this purpose; in particular, they may form a (segmented) inner ring of the guide vane array or be adapted for this purpose.

In the present case, the directional indication "axial" refers in particular to an installed position of the guide vane segment and/or to a direction parallel to an axis of rotation, respectively the (main) machine axis of the turbomachine (stage); the directional indication "radial" refers in particular to an installed position of the guide vane segment and/or to a direction orthogonal to an or the axis of rotation, respectively the (main) machine axis of the turbomachine (stage); the directional indication "circumferentially" refers in particular to an installed position of the guide vane segment and/or to a circumferential direction about an or the axis of rotation, respectively (main) machine axis of the turbomachine (stage), and/or to a direction tangential to a (main) direction of rotation of the turbomachine (stage); the directional indication "upstream/downstream" refers in particular to an installed position and/or design or a normal operation of the guide vane segment.

In an embodiment of the present invention, a portion of the inner ring segment, referred to in the present case as a detuning region, extends respectively from a downstream, respectively rear or trailing edge of at least one guide vane, in particular from at least 50%, in particular at least 75%, in particular at least 90%, in particular 100% of the guide vanes of the guide vane segment axially toward an upstream, respectively front or leading edge of the guide vane over, respectively by at most 50%, in particular at most 30%, in particular at most 15%, of an (axial, in particular maximum) width of the inner ring segment and/or (axially toward a, respectively the upstream, respectively front or leading edge of the guide vane over or by) at most 5 mm, in particular at most 3 mm, in particular at most 2 mm; and/or circumferentially on both sides, respectively, over or by at most 25%, in particular at most 10%, in particular at most 5%, of a (in particular maximum or minimum) spacing of (circumferentially) adjacent guide vanes, in particular between the (respective) trailing edge and a trailing edge, respectively guide vane directly adjacent thereto, in particular circumferentially, and/or in which one cavity is or a plurality of cavities are configured, respectively, in which one or a plurality of impulse element(s) is/are configured with clearance of motion for providing impact contacts.

In an embodiment, the impulse element(s) is/are provided for inducing impact contacts; respectively, during operation, they impart impacts to the (respective) cavity, respectively the walls thereof by contact therewith, respectively is/are designed for this purpose or accordingly. In the present case, in particular as is customary in the art, an impact contact is understood to be a short-duration or pulse-like, in particular at least essentially completely elastic and/or stochastic or random contact. In this regard, reference is also made to WO 2012/095067 A1.

Surprisingly, it has been found that by positioning (cavities containing) impulse elements near the trailing edges of one or of a plurality of guide vane(s), in particular of the, preferably large majority of the, in particular of all of the guide vanes of the guide vane segment, in the axial and/or circumferential direction in particular, airfoil modes of these guide vanes may be very effectively detuned or reduced.

An embodiment provides for a detuning region to extend circumferentially on both sides, over or by at most 25%, in particular by at most 10%, in particular by at most 5% of a spacing between adjacent guide vanes, thus, altogether in the circumferential direction, over or by at most 50%, in particular by at most 20%, in particular at most 10% of the spacing, respectively.

In an embodiment, at least 75%, in particular at least 90%, in particular 100% of all impulse elements configured at and/or in the inner ring segment are located at and/or in this or these detuning region(s).

Surprisingly, it has been found that concentrating the impulse elements in this manner near the trailing edges makes it possible to very effectively detune or reduce airfoil modes, in particular.

In an embodiment, the or one impulse element or a plurality thereof is/are (each) spherical in shape and/or is/are fabricated of metal, $Al_2O_3$ and/or of $CrO_2$.

This makes it possible to realize an advantageous impact contact.

In an embodiment, exactly one impulse element is located (in each case) in the or in one cavity or in a plurality thereof.

This makes it possible to realize advantageous single impact contacts.

In one variant, it is also additionally or alternatively conceivable, purely theoretically, to configure two or more impulse elements (in each case) in the or in one cavity or in a plurality thereof.

Impact contacts may also be hereby realized between impulse elements.

In an embodiment, the or one impulse element or a plurality thereof is/are (each) unrestrainably or freely movably contained in a cavity which, in a further refinement, may be air-filled.

This makes it possible to realize an advantageous impact contact.

In an embodiment, the or one cavity or a plurality thereof is/are (each) configured in one housing or in a plurality thereof that is/are produced separately (from the inner ring segment).

One housing has or a plurality thereof may hereby (each) have one cavity or a plurality thereof that at least partially contain impulse elements and/or be non-destructively detachably or destructively detachably attached to or in the inner ring segment, respectively to the detuning region(s) thereof, in particular on a side facing away from the guide vane. Additionally or alternatively, in an embodiment, one cavity or a plurality thereof of one housing or of a plurality thereof, which at least partially contain impulse elements, may (each) be sealed airtight, in particular by one, in particular shared cover.

In an embodiment, total number $n_G$ of all housings configured on or in the inner ring segment and containing impulse elements is less than or equal to number $n_S$ of the guide vanes, in particular less by one than the number of guide vanes ($n_G \leq n_S$, in particular $n_G = n_S - 1$).

Surprisingly, it has been found that coordinating the number of impulse element housings and the number of guide vanes to one another in this manner makes it possible to very effectively detune or reduce airfoil modes, in particular.

In an embodiment, the or one impulse element has or a plurality thereof (each) have a mass of at least 0.01 grams (g), in particular of at least 0.02 g, and/or at most of 0.05 g, in particular at most of 0.03 g.

Additionally or alternatively, in an embodiment, the or one impulse element has or a plurality thereof (each) have an, in particular a minimum or maximum diameter of at least 1 mm and/or of at most of 5 mm, in particular at 20° C.

Additionally or alternatively, in an embodiment, the clearance of motion of the or one impulse element or of a plurality thereof (in each case) is at least 0.01 mm, in particular at least 0.1 mm, and/or at least 1% of a minimum diameter of this impulse element, and or at most 10 mm, in particular at most 1 mm, and/or at most 100% of a maximum diameter of this impulse element, in particular at 20° C.

Surprisingly, it has been found that these parameters or boundary values, in each case already individually, in particular, however, in a combination of two or more of these parameters or boundary values, may make it very advantageously possible to detune or reduce airfoil modes.

In an embodiment, the or one impulse element or a plurality thereof is/are configured or used for detuning airfoil modes of the guide vane segment, in particular using one or a plurality of the parameters explained above and/or experimentally or by simulation.

BRIEF DESCRIPTION OF THE DRAWINGS

Further advantageous embodiments of the present invention will become apparent from the dependent claims and the following description of preferred embodiments. To this end, the drawing shows, partly in schematic form, in:

FIG. 1: a guide vane segment of a turbomachine in accordance with a variant of the present invention in an axial rear view;

FIG. 2: the guide vane segment in a lateral view in the circumferential direction.

DETAILED DESCRIPTION

Figure 3:
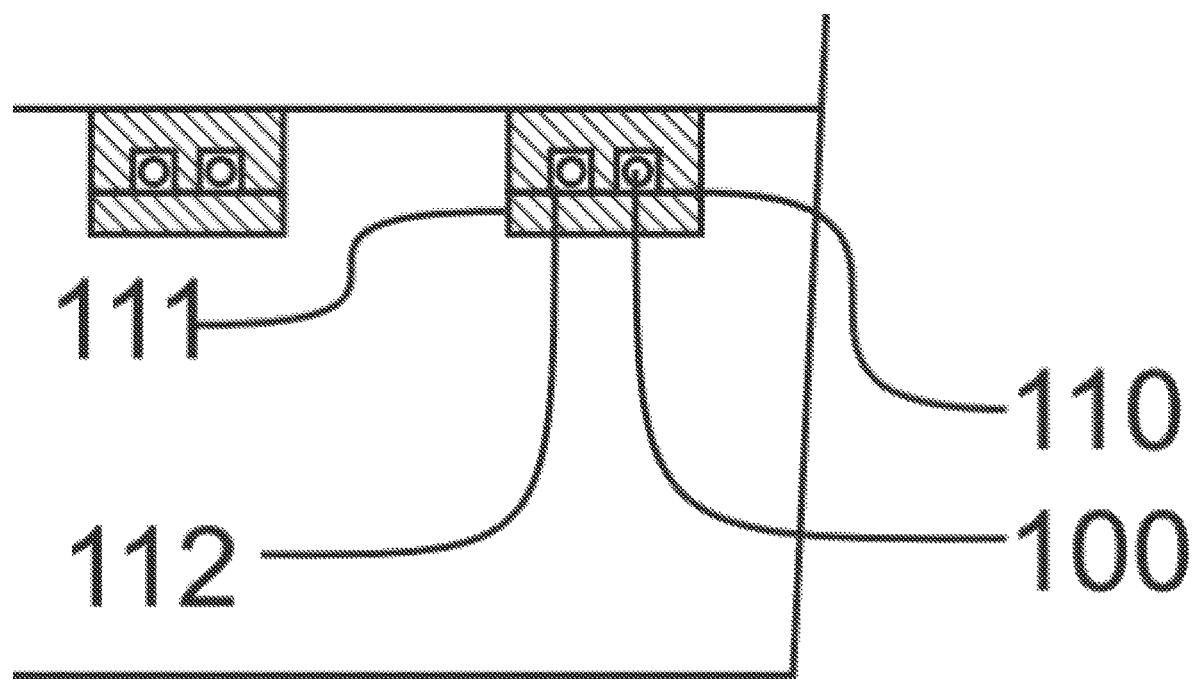
FIG. 3: a larger scale view of the housing, cover, cavity and impulse element.

FIG. 1 shows a guide vane segment of a compressor or turbine stage 1100 of a turbomachine 1000 (shown schematically), which may be an aircraft engine gas turbine, according to one variant of the present invention in an axial rear view opposite a (design) through flow direction; FIG. 2 shows a lateral view in the circumferential direction.

The guide vane segment has an inner ring segment 10 and a plurality of guide vanes 20 having downstream (to the right in FIG. 2) trailing or rear edges 21 that are integrally formed with inner ring segment 10.

One detuning region V of inner ring segment 10 extends in each case from the five trailing edges 21, axially toward a leading edge 22 of particular guide vane 20 (to the left in FIG. 2) over or by at most 50% of a width B of inner ring segment 10, and/or by at most 5 mm and circumferentially (compare FIG. 1) on both sides, respectively, over or by at most 25% of a spacing A between adjacent guide vane (outlet edges), (so that the total circumferential extent thereof is at most 50% of spacing A), to which is attached in each case a separately produced housing 110 having a plurality of air-filled cavities 112, in each of which a spherical impulse element 100 is configured with clearance of motion for providing impact contacts, and which are sealed airtight by a shared cover 111, see FIG. 3.

Although exemplary embodiments were explained in the preceding description, it should be noted that many modifications are possible.

Thus, in a modification (not shown) of a circumferentially outermost trailing edge 21 (to the left or right in FIG. 1), no detuning region V extends that has cavities 112 containing impulse elements 110.

Similarly, in a modification, cavities 112 may also be directly formed in inner ring segment 10, respectively impulse elements 100 directly configured in inner ring segment 10 without a separately produced housing 110.

It should also be appreciated that the exemplary embodiments are merely examples, and are in no way intended to restrict the scope of protection, the uses or the design. Rather, the foregoing description provides one skilled in the art with a guideline for realizing at least one exemplary embodiment, various modifications being possible, particularly with regard to the function and configuration of the described components, without departing from the scope of protection as is derived from the claims and the combinations of features equivalent thereto.

LIST OF REFERENCE NUMERALS

10 inner ring segment
20 guide vane
21 trailing edge
22 leading edge
100 impulse element
110 housing
111 cover
112 cavity
A spacing
B width
V detuning region

What is claimed is:

1. A guide vane segment for a turbomachine stage comprising:
    an inner ring segment; and
    a plurality of guide vanes on the inner ring segment;
    at least one detuning region of the inner ring segment, each of said at least one detuning regions extending and starting from a trailing edge of a respective guide vane of the plurality of guide vanes, axially toward a leading edge of the respective guide vane over at most 30% of a width of the inner ring segment, or extending over at most 5 mm,
    at least one cavity at or in the at least one detuning region and containing at least one impulse element with clearance of motion;
    wherein the at least one impulse element is a spherical ball.

2. The guide vane segment as recited in claim 1 wherein at least 75% of a number of the at least one impulse element at or in the inner ring segment are located in the at least one detuning region.

3. The guide vane segment as recited in claim 1 wherein the at least one cavity contains exactly one of the at least one impulse element.

4. The guide vane segment as recited in claim 1 further comprising a housing attached to the inner ring segment, wherein the at least one cavity is in the housing.

5. The guide vane segment as recited in claim 4 wherein the at least one cavity is airtight.

6. The guide vane segment as recited in claim 1 further comprising at least one housing, a total number of the at least one housing being less than or equal to a number of the plurality of guide vanes.

7. The guide vane segment as recited in claim 6 wherein the total number of the at least one housing is less by one than the number of the plurality of guide vanes.

8. The guide vane segment as recited in claim 1 wherein the at least one impulse element has a mass of at least 0.01 g and at most 0.05 g.

9. The guide vane segment as recited in claim 1 wherein the at least one impulse element has a minimum diameter of at least 1 mm and a maximum diameter of at most 5 mm.

10. The guide vane segment as recited in claim 1 wherein the clearance of motion of the at least one impulse element is at least 0.01 mm or at least 1% of a minimum diameter of the at least one impulse element, and at most 10 mm or at most 100% of a maximum diameter of the at least one impulse element.

11. The guide vane segment as recited in claim 1 wherein the at least one impulse element detunes airfoil modes of the guide vane segment.

12. A turbomachine stage comprising at least one guide vane segment as recited in claim 1.

13. A compressor or turbine stage comprising the turbomachine stage as recited in claim 12.

14. A turbomachine comprising at least one turbomachine stage as recited in claim 12.

15. A gas turbine comprising the turbomachine as recited in claim 14.

16. An aircraft engine gas turbine comprising the gas turbine as recited in claim 15.

17. The guide vane segment as recited in claim 1 wherein the at least one impulse element is made of $Al_2O_3$.

18. The guide vane segment as recited in claim 1 wherein the at least one impulse element is made of $CrO_2$.

* * * * *